US012616165B1

(12) United States Patent
Sheng

(10) Patent No.: US 12,616,165 B1
(45) Date of Patent: May 5, 2026

(54) PET HOUSING CRATE

(71) Applicant: Wenjun Sheng, Shenzhen (CN)

(72) Inventor: Wenjun Sheng, Shenzhen (CN)

( * ) Notice: Subject to any disclaimer, the term of this patent is extended or adjusted under 35 U.S.C. 154(b) by 0 days.

(21) Appl. No.: 19/191,523

(22) Filed: Apr. 28, 2025

(30) Foreign Application Priority Data

Apr. 21, 2025 (CN) .......................... 202520765083.7

(51) Int. Cl.
 *A01K 1/03* (2006.01)
(52) U.S. Cl.
 CPC ...................................... *A01K 1/03* (2013.01)
(58) Field of Classification Search
 CPC .......... A01K 1/03; A01K 1/033; A01K 1/034; A01K 1/0245
 See application file for complete search history.

(56) References Cited

U.S. PATENT DOCUMENTS

| | | | | |
|---|---|---|---|---|
| 8,336,500 B1 * | 12/2012 | Britt | ..................... | A01K 1/0107 |
| | | | | 119/497 |
| 2007/0163510 A1 * | 7/2007 | Dietz | .................. | A01K 1/0353 |
| | | | | 119/443 |

| | | | | |
|---|---|---|---|---|
| 2007/0181076 A1 * | 8/2007 | Dietz | ................... | A01K 1/0353 |
| | | | | 119/482 |
| 2008/0196673 A1 * | 8/2008 | Cudia | .................... | A01K 31/08 |
| | | | | 52/582.1 |
| 2019/0230895 A1 * | 8/2019 | Lin | ......................... | A01K 1/035 |
| 2021/0392849 A1 * | 12/2021 | Stier | .................... | A01K 1/0103 |
| 2022/0378011 A1 * | 12/2022 | Crampton | ............ | A01K 1/0356 |
| 2024/0324549 A1 * | 10/2024 | Lu | ........................... | A01K 1/033 |

* cited by examiner

*Primary Examiner* — Monica L Perry
*Assistant Examiner* — Aaron M Rodziwicz

(57) ABSTRACT

A pet housing crate includes a main crate body and a first door. Sidewalls of the main crate body enclose to form a containment space for accommodating a pet, and the main crate body has a first pet access opening in communication with the containment space. The first door is connected to the main crate body, and the first door is movable between an open position and a closed position. When the first door is in the closed position, the first door covers the first pet access opening. When the first door is in the open position, the first door exposes the first pet access opening. The first door is a transparent one. This configuration enables the pet to enter the containment space through the first pet access opening, allowing the pet to rest and sleep within the containment space.

20 Claims, 19 Drawing Sheets

PET HOUSING CRATE

CROSS-REFERENCE TO RELATED APPLICATIONS

The present invention claims priority of Chinese patent application CN2025207650837, filed on Apr. 21, 2025, which is incorporated herein by reference in its entireties.

TECHNICAL FIELD

The present invention relates to the field of pet accessories, in particular to a pet housing crate.

BACKGROUND

Pets perform important functions in human life, providing not only emotional companionship but also positive influences on mental and physical health, social interactions, and the growth and development of specific populations. To sustain these benefits, it is necessary to provide a stable environment for pet feeding. Therefore, there is an urgent need in the market for a pet housing crate that provides a secure living environment, offering protection from external factors and ensuring safe, undisturbed rest and sleep.

SUMMARY

In order to overcome the shortcomings of the prior art, the present invention provides a pet housing crate, which includes a main crate body and a first door.

Sidewalls of the main crate body enclose to form a containment space for accommodating a pet, and the main crate body has a first pet access opening in communication with the containment space.

The first door is connected to the main crate body, and the first door is movable between an open position and a closed position. When the first door is in the closed position, the first door covers the first pet access opening. When the first door is in the open position, the first door exposes the first pet access opening. The first door is a transparent one.

The present invention has the following beneficial effects. The present invention provides a pet housing crate. Since the pet housing crate includes: the main crate body, whose sidewalls enclose to form the containment space for accommodating a pet, with the main crate body having a first pet access opening in communication with the containment space; the first door, which is connected to the main crate body and is movable between the open position and the closed position. When the first door is in the closed position, the first door seals the first pet access opening; when the first door is in the open position, the first door exposes the first pet access opening. The first door is transparent. This configuration enables the pet to enter the containment space through the first pet access opening, allowing the pet to rest and sleep within the containment space. Moreover, the first door covers the opening, thereby confining the pet within the containment space and preventing the pet from escaping. Further, the transparency of the first door allows light to pass through into the containment space, enhancing the sense of security of the pet while enabling pet owners to observe the pet's activities clearly, thereby facilitating interaction and aiding owners in understanding habits, promptly identifying health issues, and providing optimal care.

DETAILED DESCRIPTION OF THE EMBODIMENTS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

Figure 1:
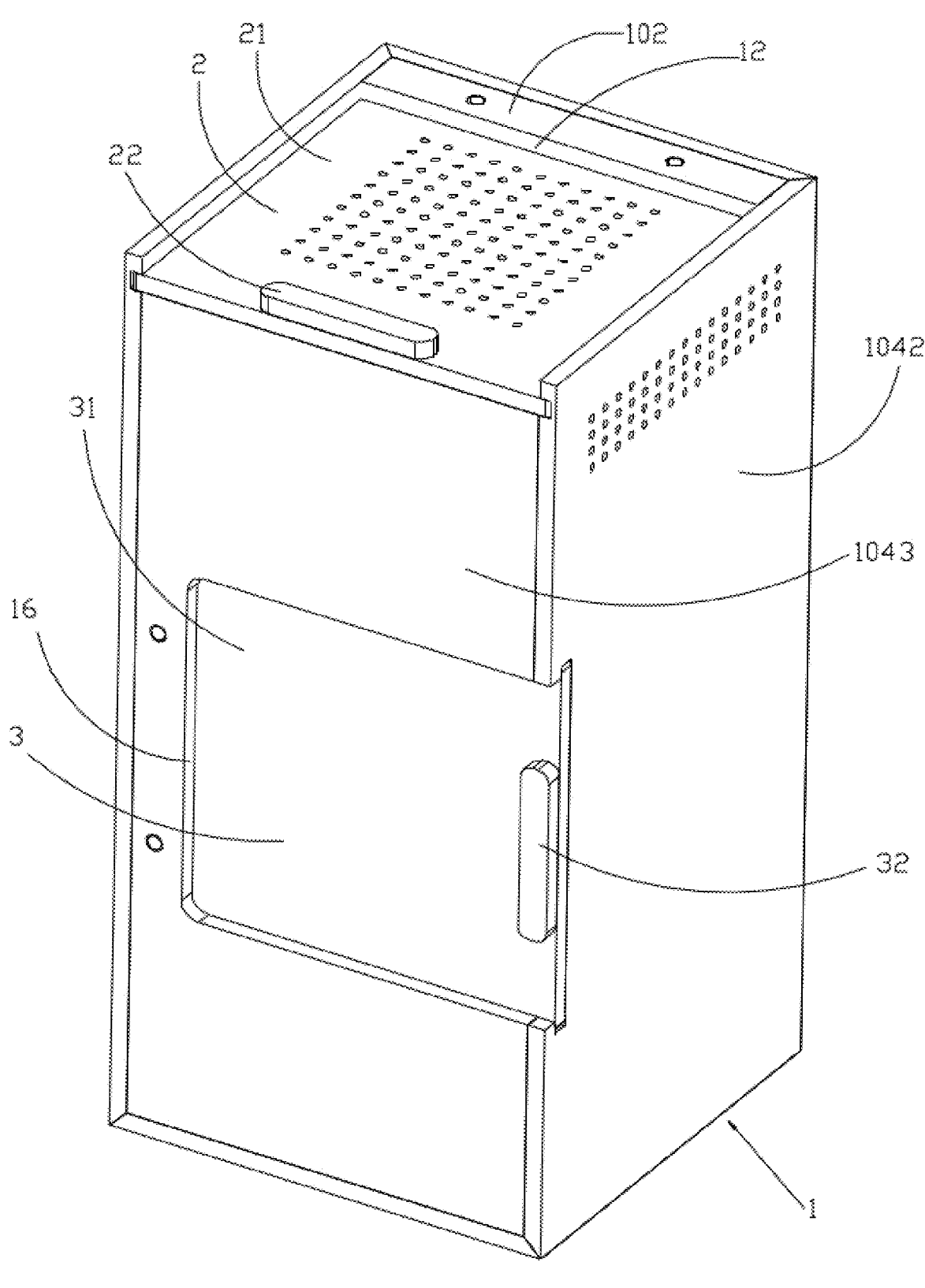
FIG. 1 is a schematic view of an overall structure according to the present invention.

Referring to FIGS. 1 to 19, a pet housing crate includes a main crate body 1 and a first door 2.

Sidewalls of the main crate body 1 enclose to form a containment space 11 for accommodating a pet, and the main crate body 1 has a first pet access opening 12 in communication with the containment space 11.

The first door 2 is connected to the main crate body 1, and the first door 2 is movable between an open position and a closed position. When the first door 2 is in the closed position, the first door 2 covers the first pet access opening 12. When the first door 2 is in the open position, the first door 2 exposes the first pet access opening 12. The first door 2 is a transparent one.

Through the above structure, since the pet housing crate includes: the main crate body 1, whose sidewalls enclose to form the containment space 11 for accommodating a pet, with the main crate body 1 having a first pet access opening 12 in communication with the containment space 11; the first door 2, which is connected to the main crate body 1 and is movable between the open position and the closed position. When the first door 2 is in the closed position, the first door 2 seals the first pet access opening 12; when the first door 2 is in the open position, the first door 2 exposes the first pet access opening 12. The first door 2 is transparent. This configuration enables the pet to enter the containment space 11 through the first pet access opening 12, allowing the pet to rest and sleep within the containment space 11. Moreover, the first door 2 covers the opening, thereby confining the pet within the containment space 11 and preventing the pet from escaping. Further, the transparency of the first door 2 allows light to pass through into the containment space 11, enhancing the sense of security of the pet while enabling pet owners to observe the pet's activities clearly, thereby facilitating interaction and aiding owners in understanding habits, promptly identifying health issues, and providing optimal care.

In this embodiment, the first door 2 includes a first door body 21 and a first handle 22 connected to the first door body 21. Through the above structure, the first handle 22 facilitates the operation of the first door 2 by the pet owner, enabling the first door 2 to move between the open position and the closed position.

In this embodiment, the first door 2 has a plurality of first ventilation holes 23 arranged in sequence along longitudinal and transverse directions of the first door 2. Through the above structure, since the first door 2 has the first ventilation holes 23, compared with ordinary airtight doors, this configuration improves the air permeability inside the containment space 11, enabling the pet to rest more comfortably within the containment space 11.

Figure 2:
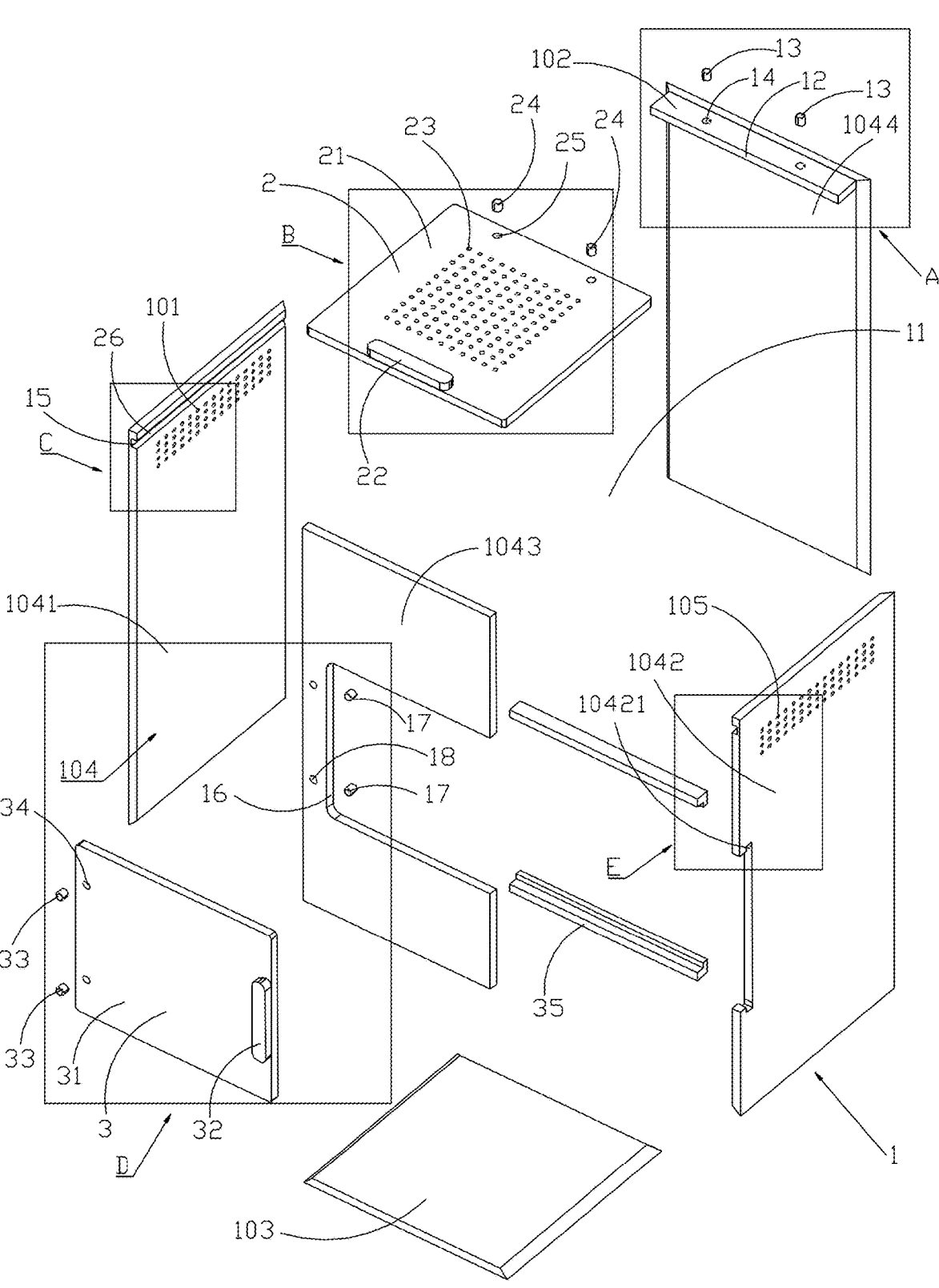
FIG. 2 is an exploded view according to the present invention.
Figure 3:
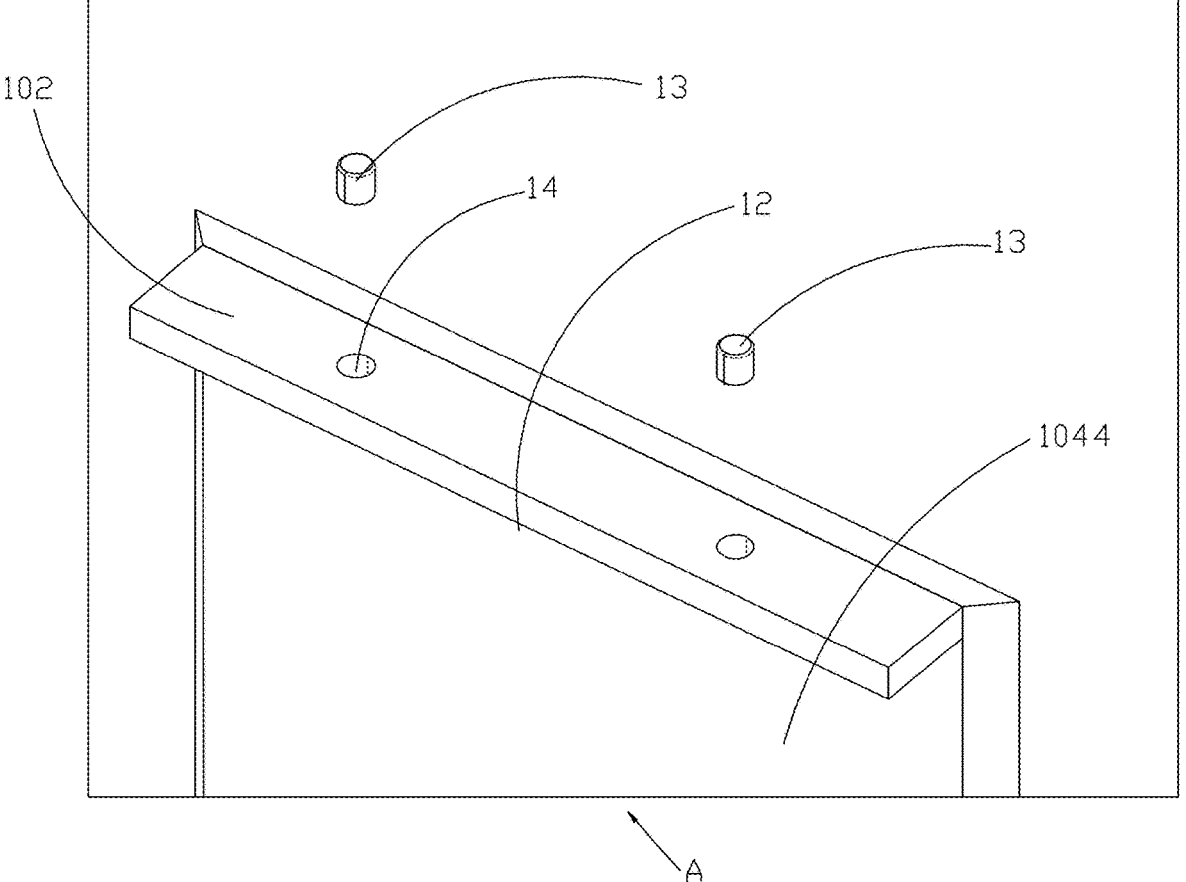
FIG. 3 is an enlarged view of area A in FIG. 2.
Figure 4:
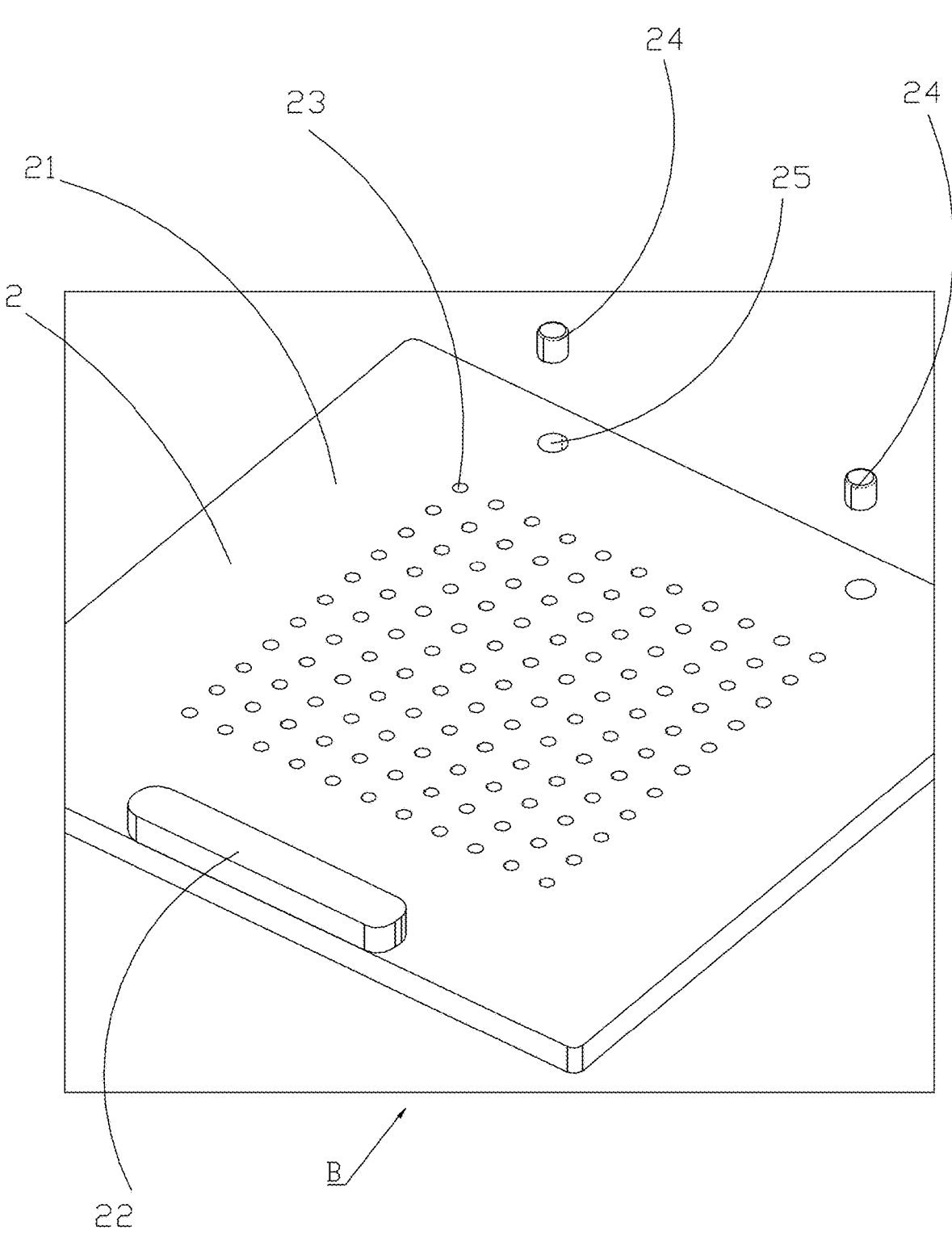
FIG. 4 is an enlarged view of area B in FIG. 2.
Figure 5:
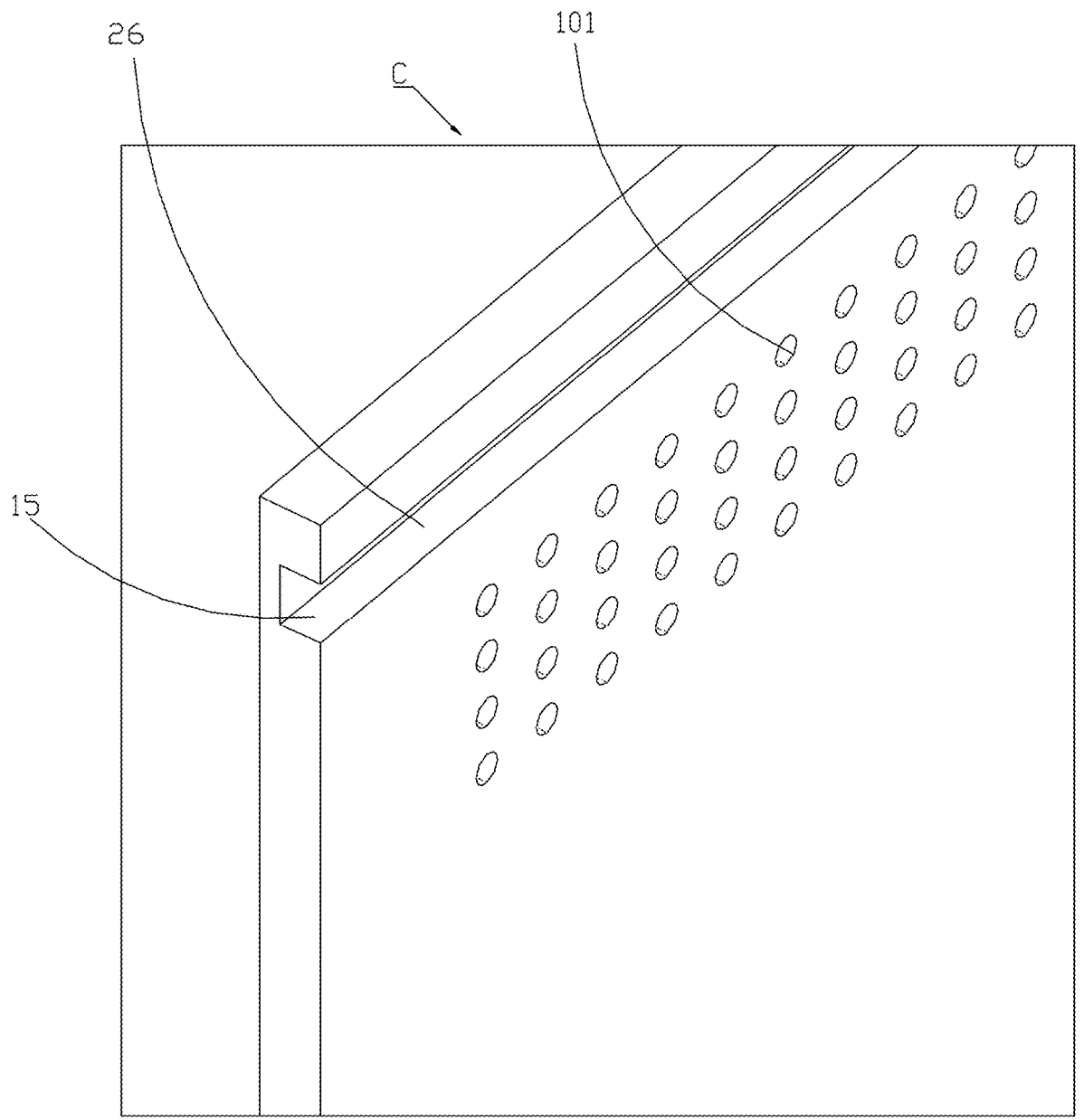
FIG. 5 is an enlarged view of area C in FIG. 2.
Figure 6:
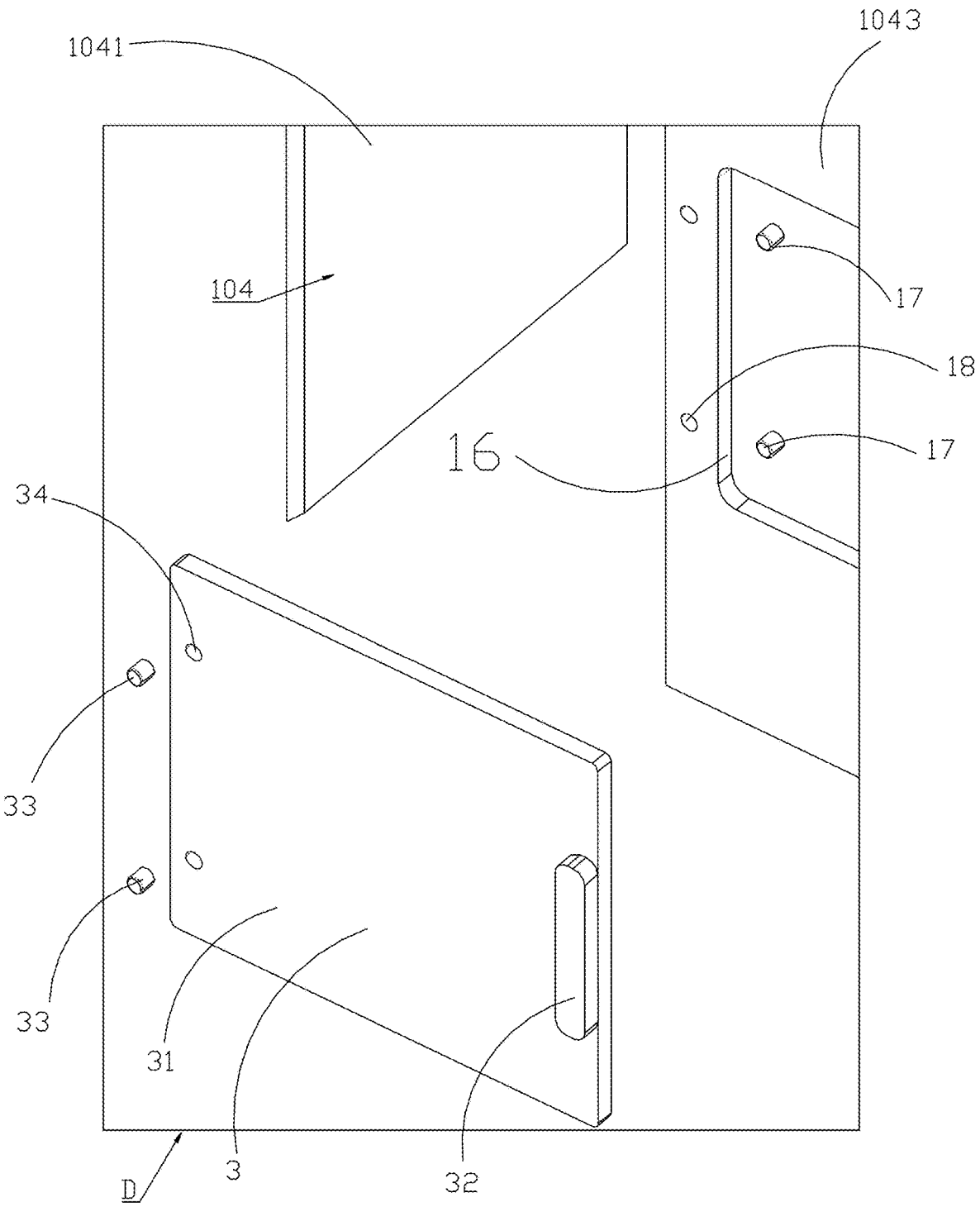
FIG. 6 is an enlarged view of area D in FIG. 2.
Figure 7:
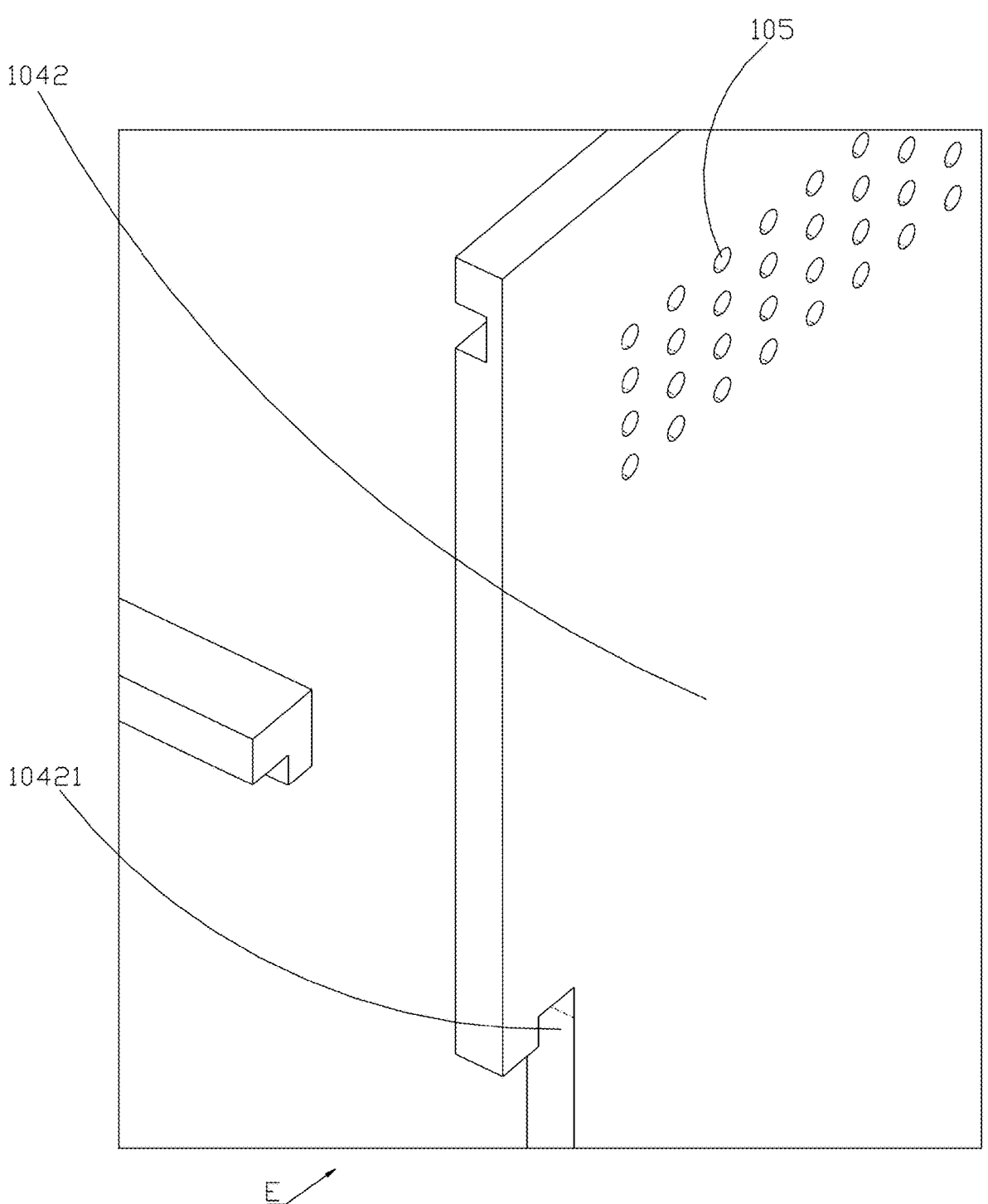
FIG. 7 is an enlarged view of area E in FIG. 2.
Figure 8:
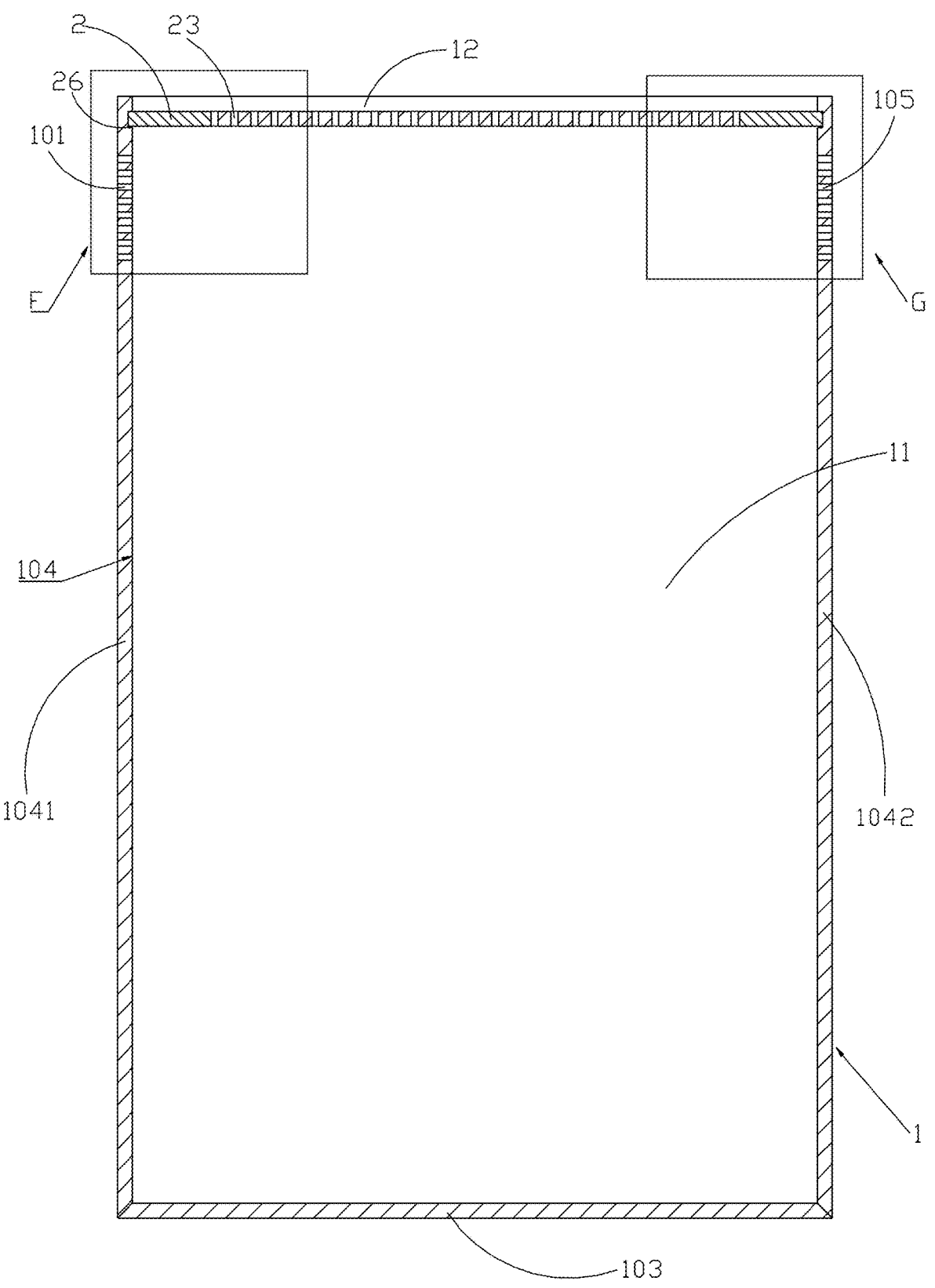
FIG. 8 is a cross-sectional view sectioned along a first door and second ventilation holes.
Figure 9:
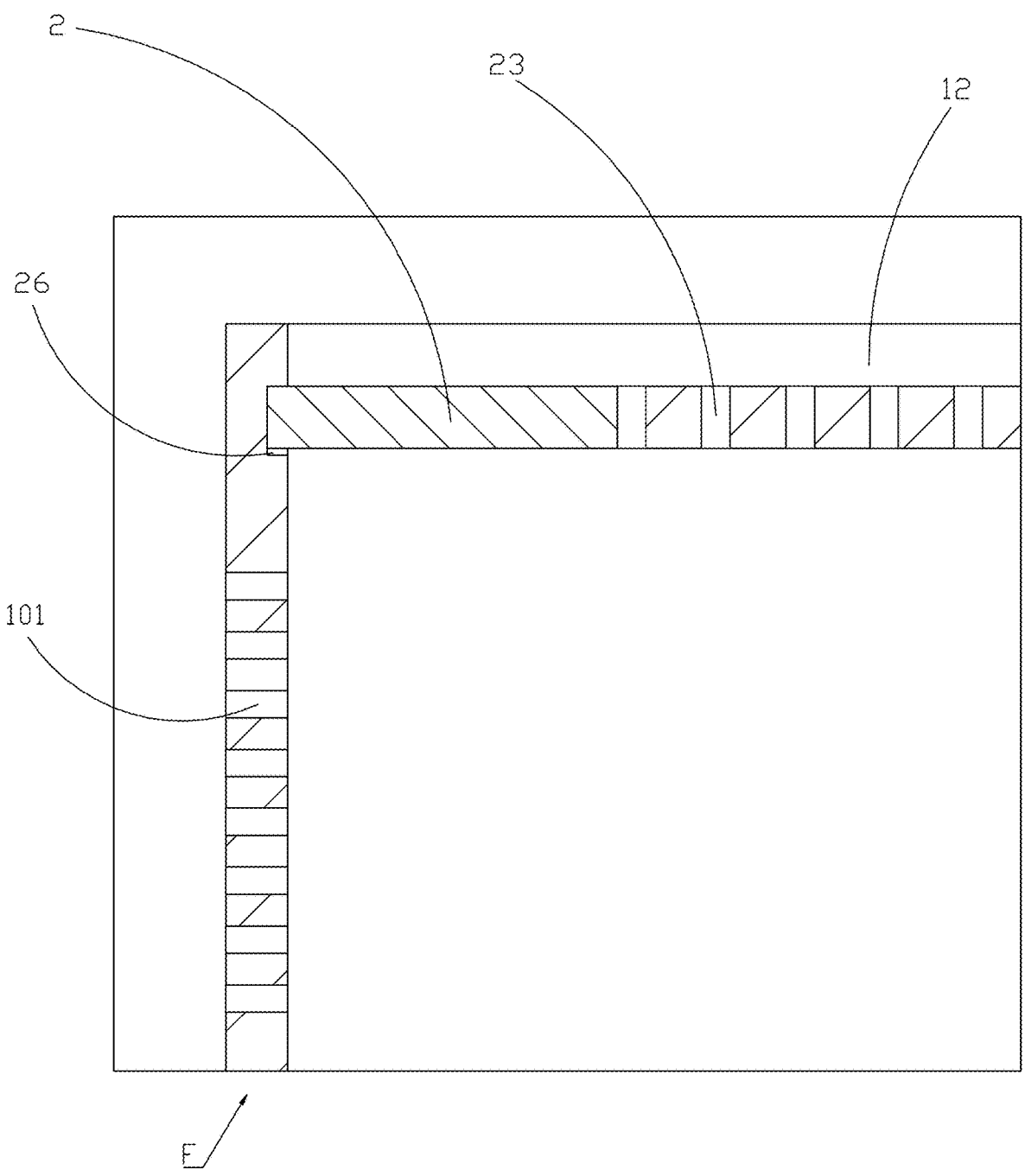
FIG. 9 is an enlarged view of area F in FIG. 8.
Figure 10:
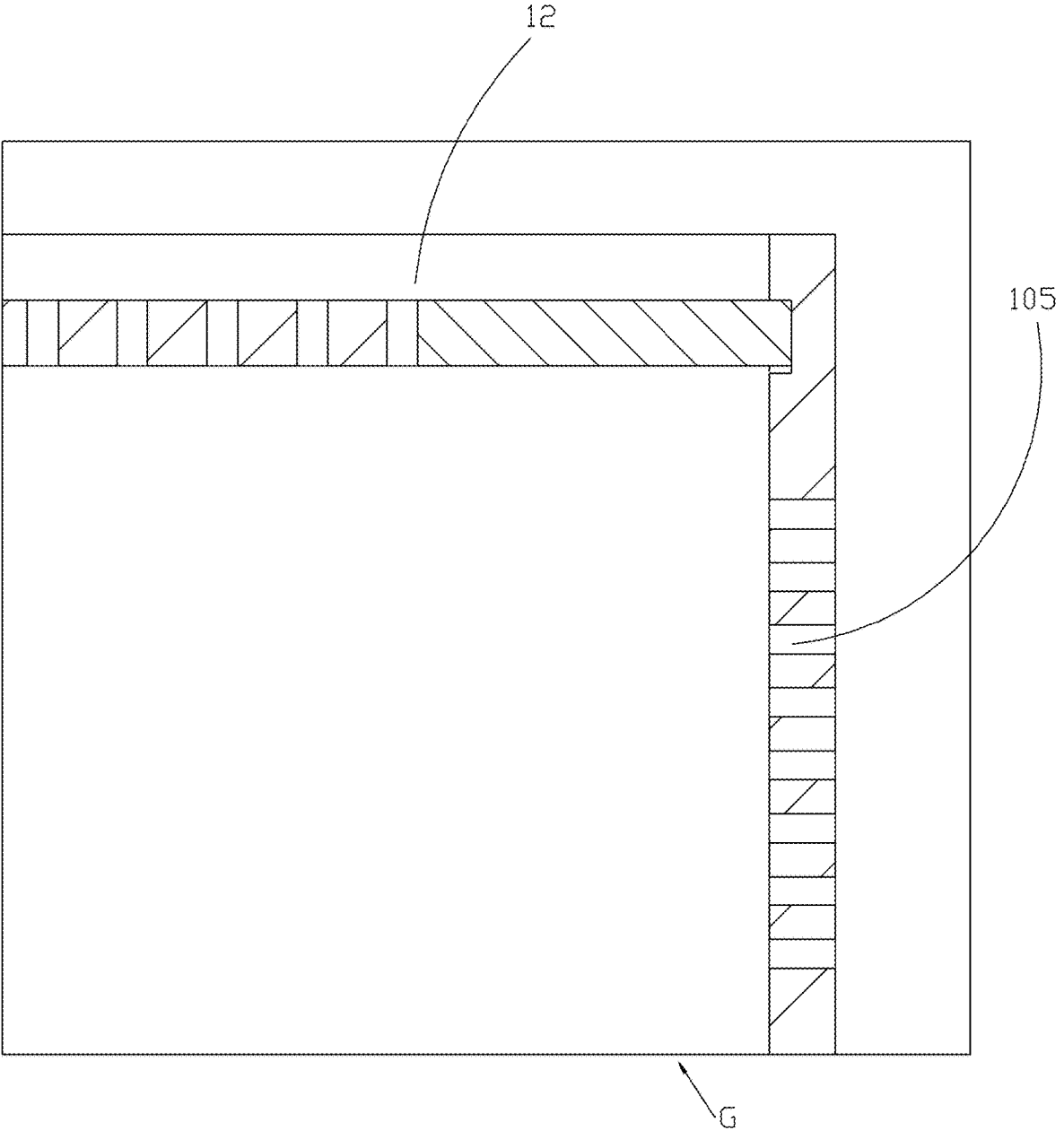
FIG. 10 is an enlarged view of area G in FIG. 8.
Figure 11:
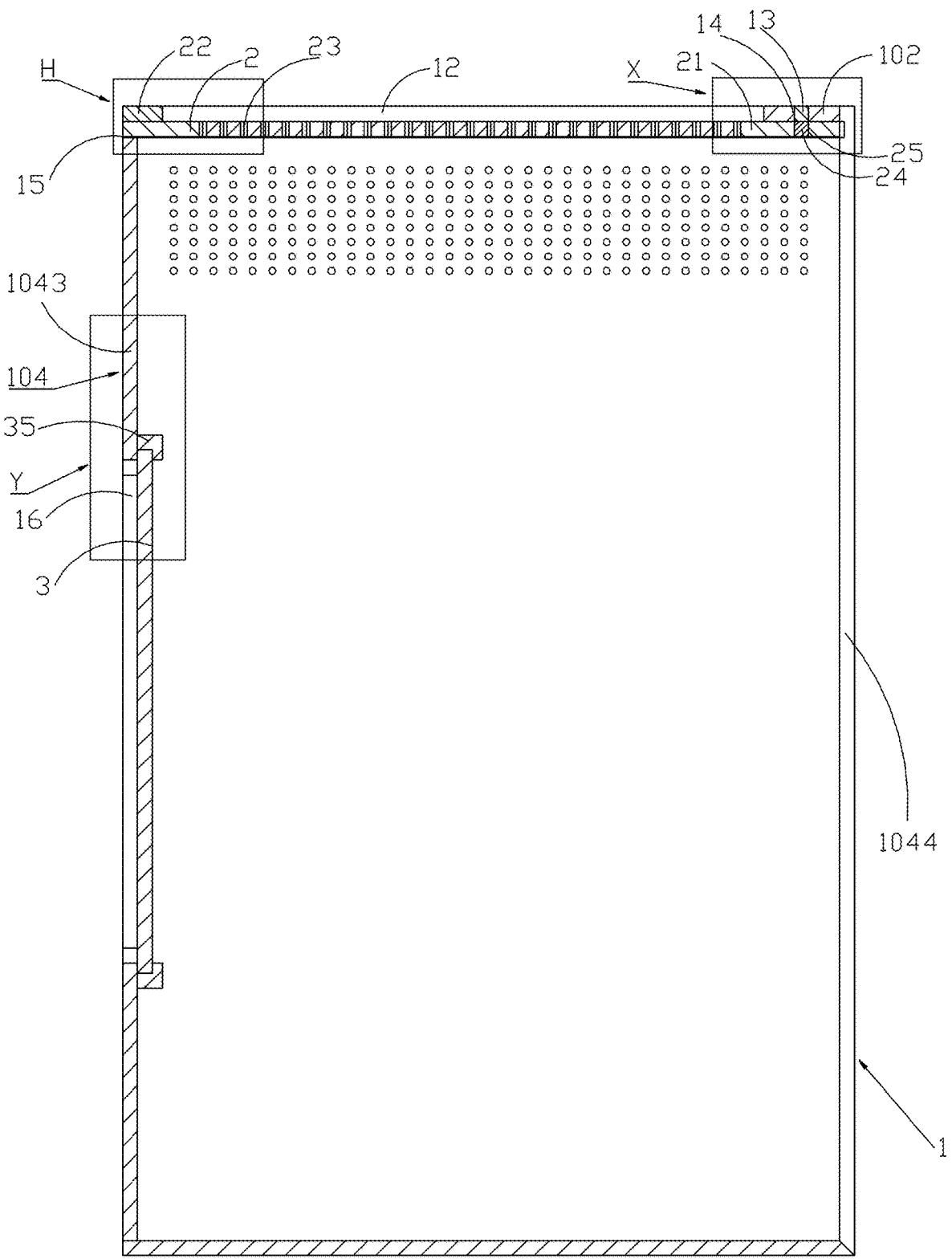
FIG. 11 is a cross-sectional view sectioned along a second door.
Figure 12:
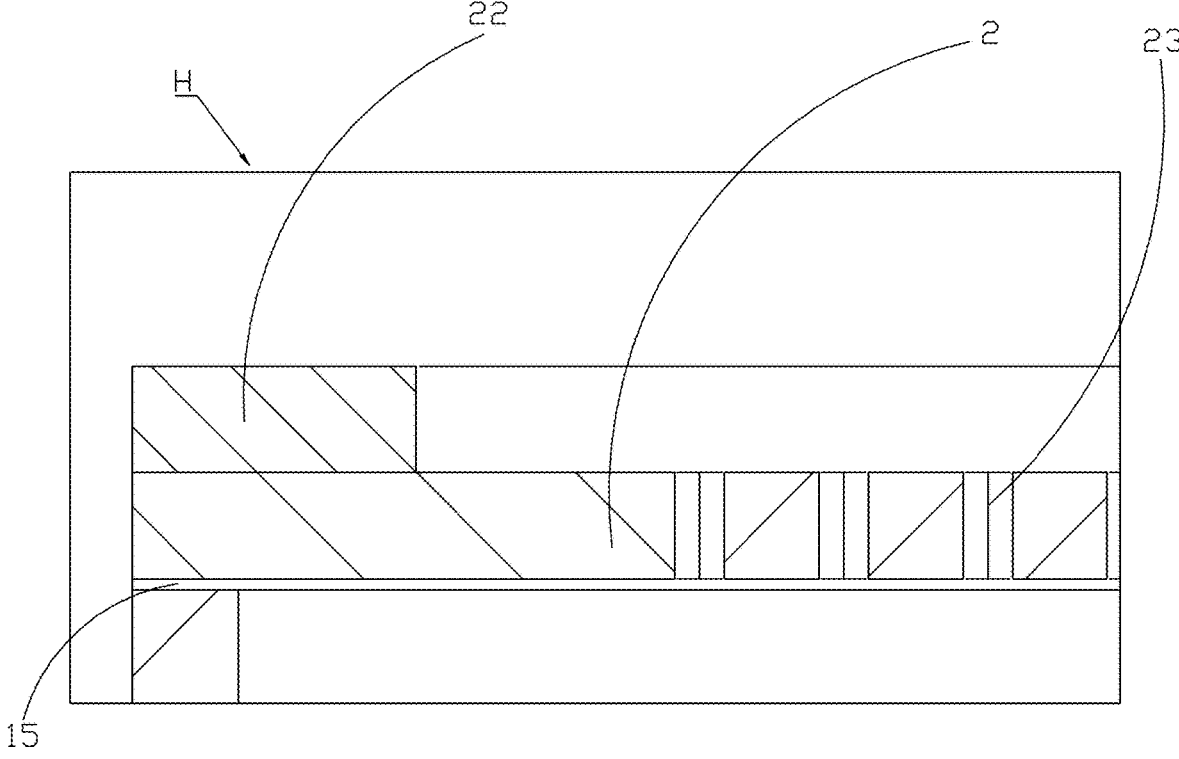
FIG. 12 is an enlarged view of area H in FIG. 11.
Figure 13:
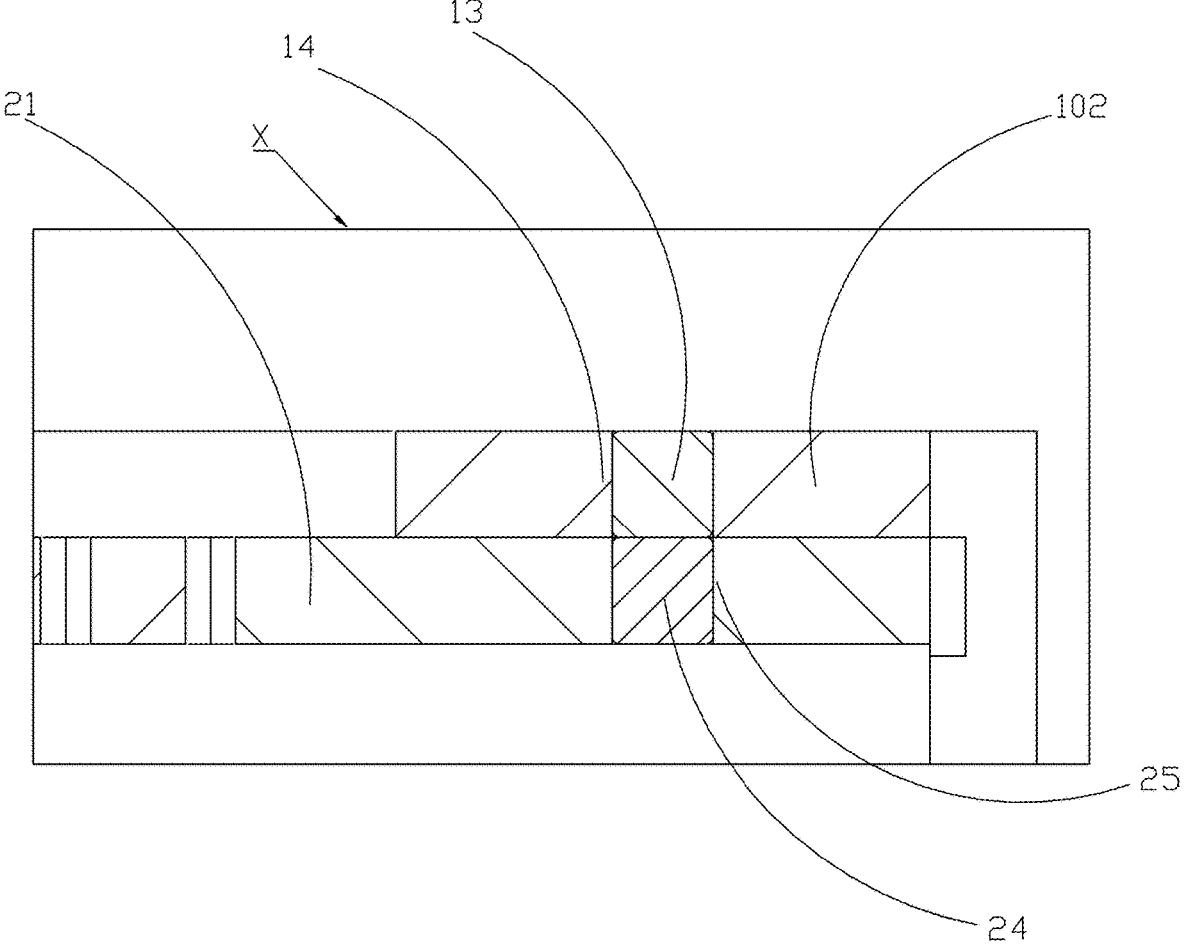
FIG. 13 is an enlarged view of area X in FIG. 11.
Figure 14:
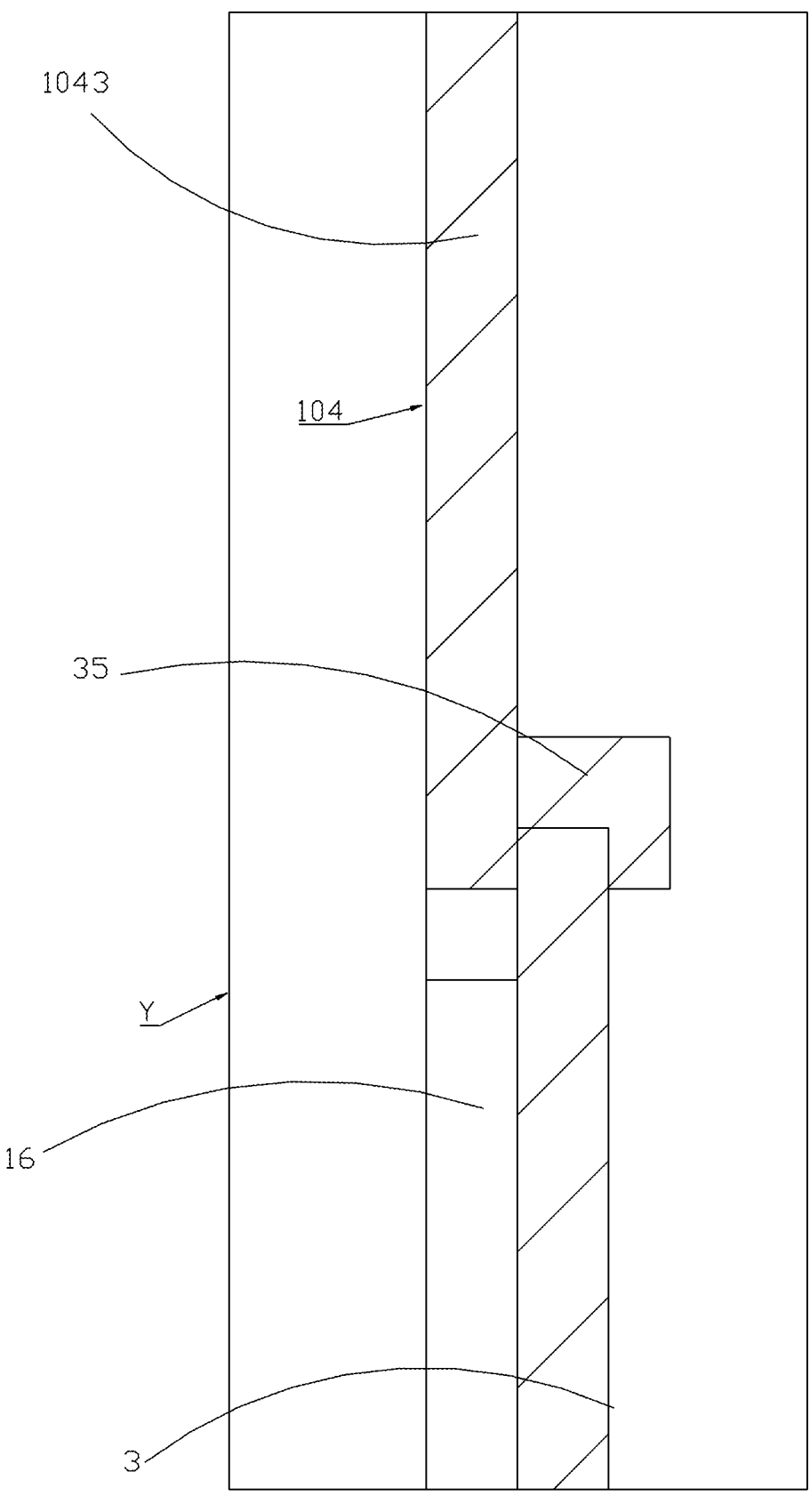
FIG. 14 is an enlarged view of area Y in FIG. 11.
Figure 15:
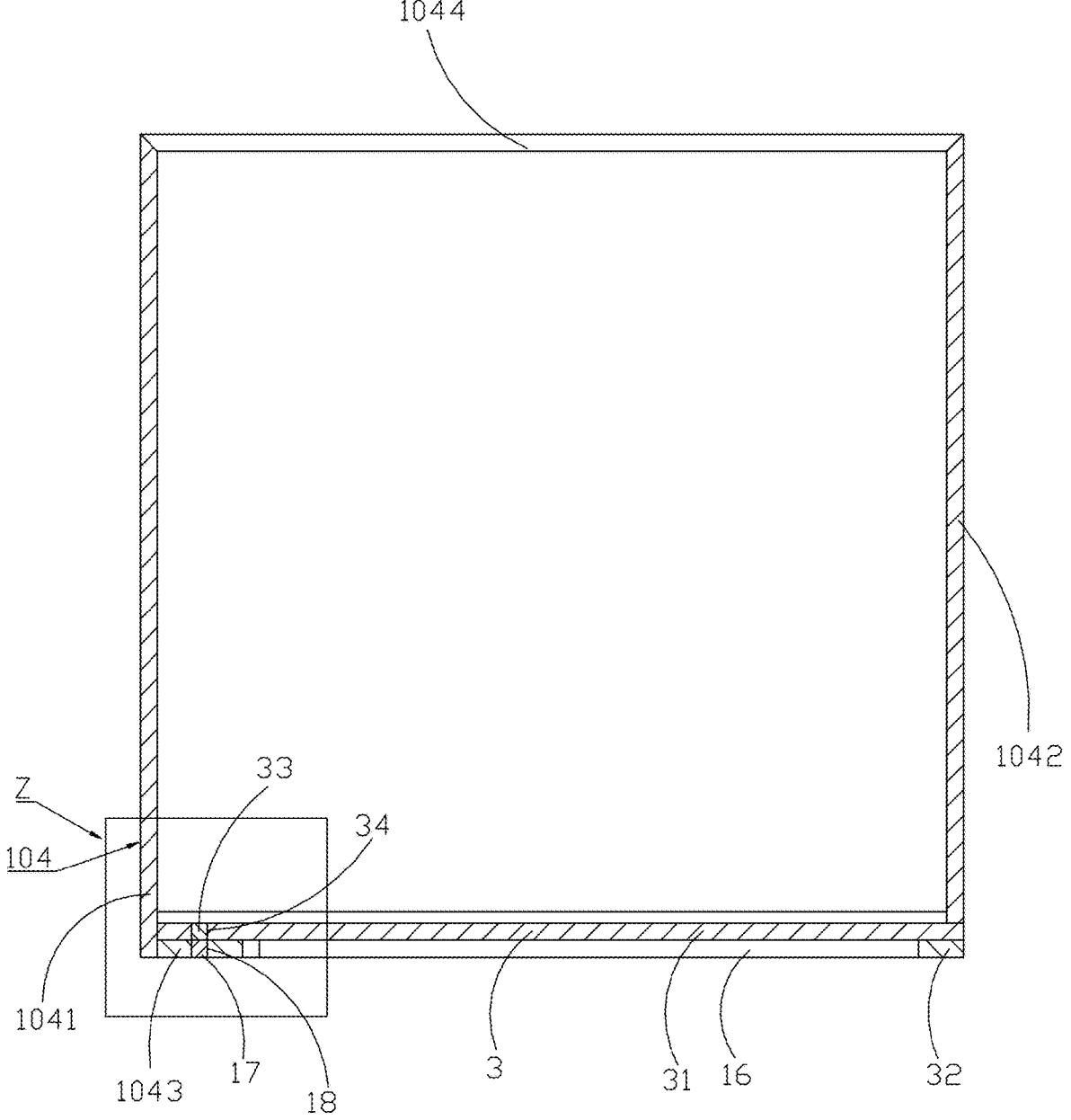
FIG. 15 is another sectional view sectioned along the second door.
Figure 16:
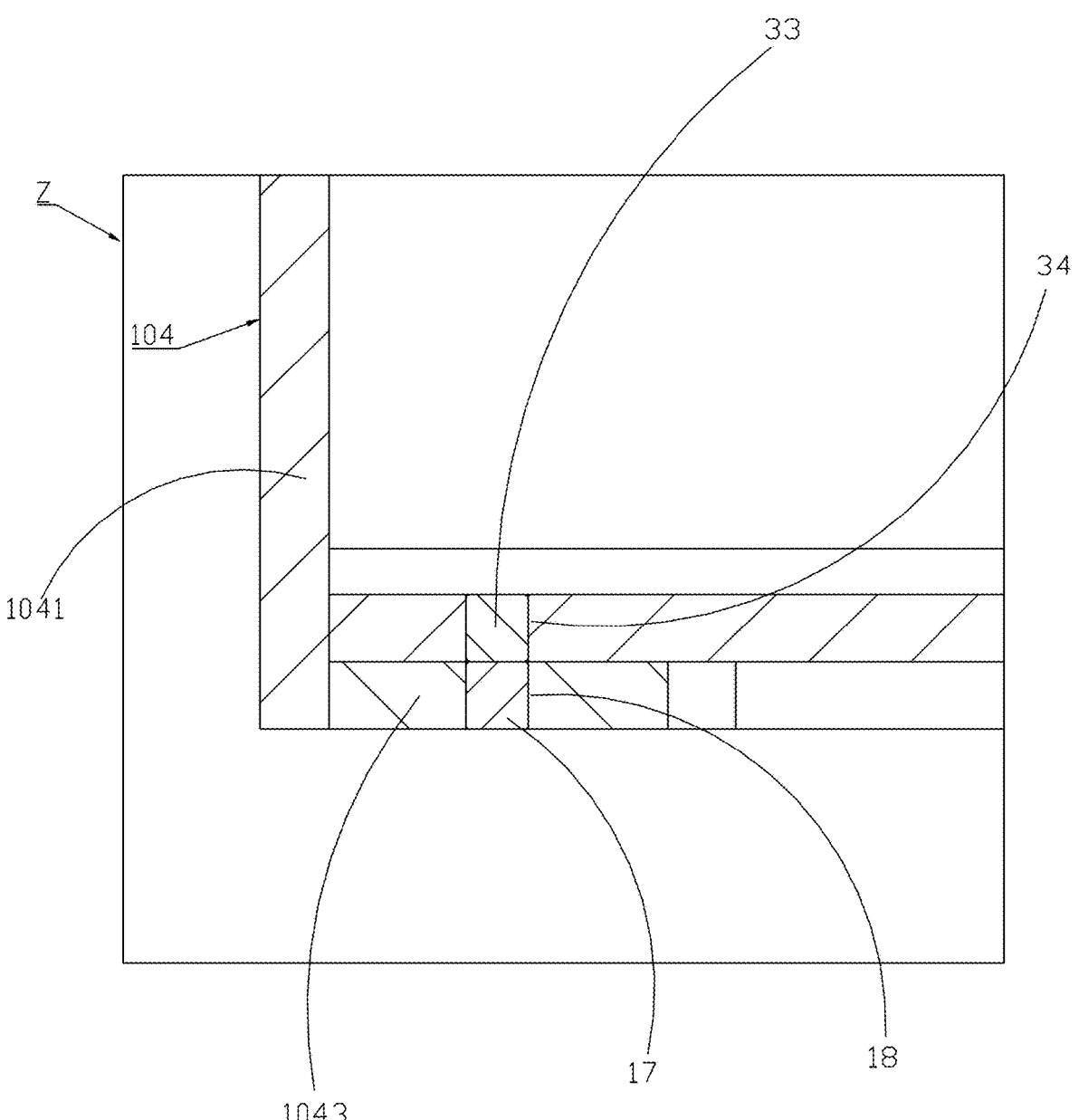
FIG. 16 is an enlarged view of area Z in FIG. 15.
Figure 17:
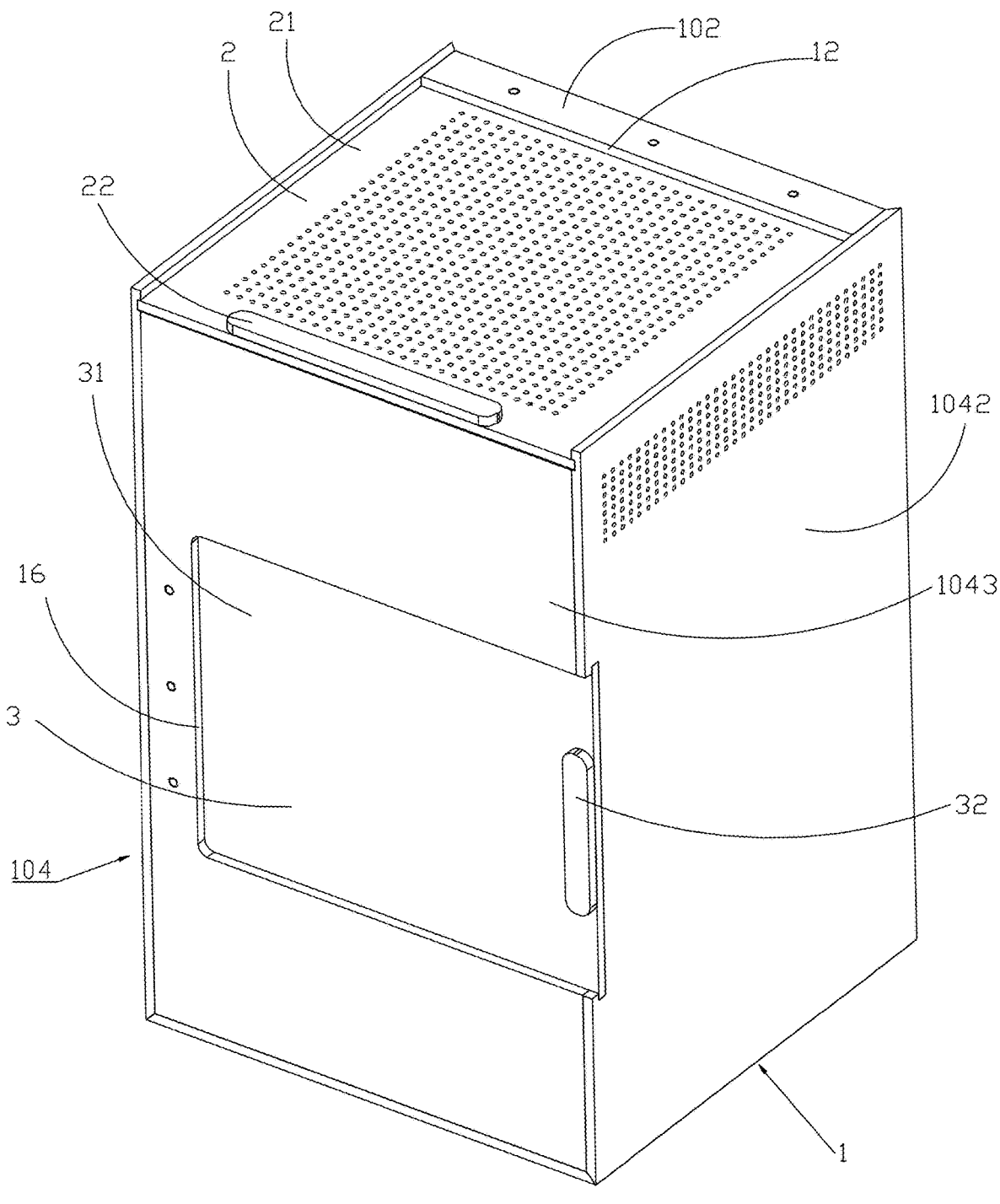
FIG. 17 is another schematic view of the overall structure according to the present invention.

Referring to FIG. 2, in this embodiment, the first door 2 is magnetically connected to the main crate body 1. A first magnet 24 is further provided. The first door 2 has a first mounting hole 25, and the first magnet 24 is embedded in the first mounting hole 25. A second magnet 13 is further provided. The main crate body 1 has a second mounting hole 14, and the second magnet 13 is embedded in the second mounting hole 14. The first magnet 24 and the second magnet 13 are attracted to connect the first door 2 to the main crate body 1 and lock the first door 2 in the closed position. Specifically, the first door 2 is slidably connected to the main crate body 1, allowing the first door 2 to slide between the open position and the closed position. Further, a first slide rail 26 is provided and is connected to the main crate body 1, and the first door 2 slides along the first slide rail 26. Further, the first slide rail 26 is connected to the inner surface of the main crate body 1. The first slide rail 26 extends from one side of the main crate body 1 to the other side of the main crate body 1. The sidewall of the main crate body 1 covers one end of the first slide rail 26. The main crate body 1 further has a first avoidance groove 15. The other end of the first slide rail 26 is exposed through the first avoidance groove 15, and the first door 2 is inserted into the first slide rail 26 through the first avoidance groove 15. Furthermore, the first slide rail 26 is either integrally formed with or detachably connected to the main crate body 1. Through the above structure, the first door 2 is inserted into the first slide rail 26 through the first avoidance groove 15 and slides on the first slide rail 26. When the first door 2 slides to the closed position, the first magnet 24 and the second magnet 13 are attracted to connect the first door 2 to the main crate body 1 and lock the first door 2 in the closed position. Moreover, since the sidewall of the main crate body 1 covers one end of the first slide rail 26, it ensures that the first door 2 slides quickly and accurately to the closed position while preventing the first door 2 from sliding out of the first slide rail 26. Additionally, the first magnet 24 is embedded in the first mounting hole 25 and the second magnet 13 is embedded in the second mounting hole 14, making both the surface of the main crate body 1 and the surface of the first door 2 flat. This enables the first door 2 to slide more smoothly along the first slide rail 26. The first slide rail 26 is formed as a recess in the surface of the main crate body 1.

In this embodiment, the main crate body 1 further includes a second pet access opening 16 and a second door 3, the second pet access opening 16 is in communication with the containment space 11, and the second door 3 is connected to the main crate body 1. The second door 3 is movable between an open position and a closed position. When the second door 3 is in the closed position, the second door 3 covers the second pet access opening 16. When the second door 3 is in the open position, the second door 3 exposes the second pet access opening 16. The second door 3 is a transparent one. Further, the second door 3 includes a second door body 31 and a second handle 32 connected to the second door body 31. The second door 3 is magnetically connected to the main crate body 1. A third magnet 33 is further provided. The second door 3 has a third mounting hole 34, and the third magnet 33 is embedded in the third mounting hole 34. A fourth magnet 17 is further provided. The main crate body 1 has a fourth mounting hole 18, and the fourth magnet 17 is embedded in the fourth mounting hole 18. The third magnet 33 and the fourth magnet 17 are attracted to connect the second door 3 to the main crate body 1 and lock the second door 3 in the closed position. Further, a second slide rail 35 is provided and is connected to the main crate body 1, the second door 3 is configured to slide between the open position and the closed position.

The second slide rail 35 extends from one side of the main crate body 1 to the other side of the main crate body 1. The sidewall of the main crate body 1 covers one end of the second slide rail 35. The main crate body 1 further has a second avoidance groove 10421. The other end of the second slide rail 35 is exposed through the second avoidance groove 10421, and the second door 3 is inserted into the second slide rail 35 through the second avoidance groove 10421. Through the above structure, the first pet access opening 12 and the second pet access opening 16 provide the pet with more access channels, making it more convenient for the pet to enter and exit the containment space 11. Meanwhile, when the second door 3 slides to the closed position, the third magnet 33 and the fourth magnet 17 attract to lock the second door 3 in the closed position. Moreover, since the sidewall of the main crate body 1 covers one end of the second slide rail 35, it ensures that the second door 3 slides quickly and accurately to the closed position and prevents the second door 3 from sliding out of the second slide rail 35. Additionally, the third magnet 33 is embedded in the third mounting hole 34, and the fourth magnet 17 is embedded in the fourth mounting hole 18, making both the surface of the main crate body 1 and the surface of the second door 3 flat. This enables the second door 3 to slide more smoothly along the second slide rail 35. Specifically, the second slide rail 35 is connected to the inner surface of the main crate body 1 by adhesive bonding or thermal fusion bonding; the second slide rail 35 is L-shaped.

Figure 18:
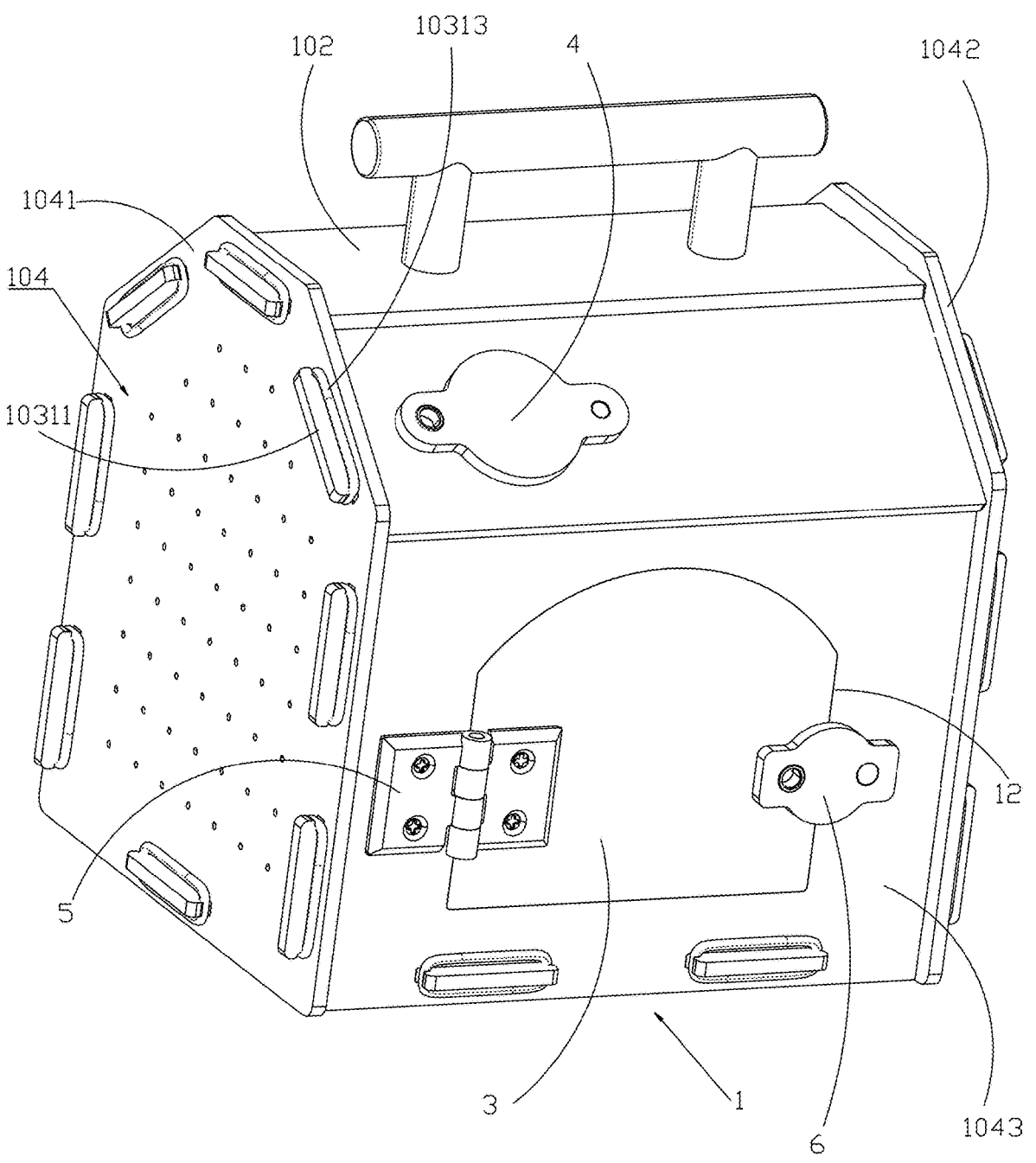
FIG. 18 is a further schematic view of the overall structure according to the present invention.
Figure 19:
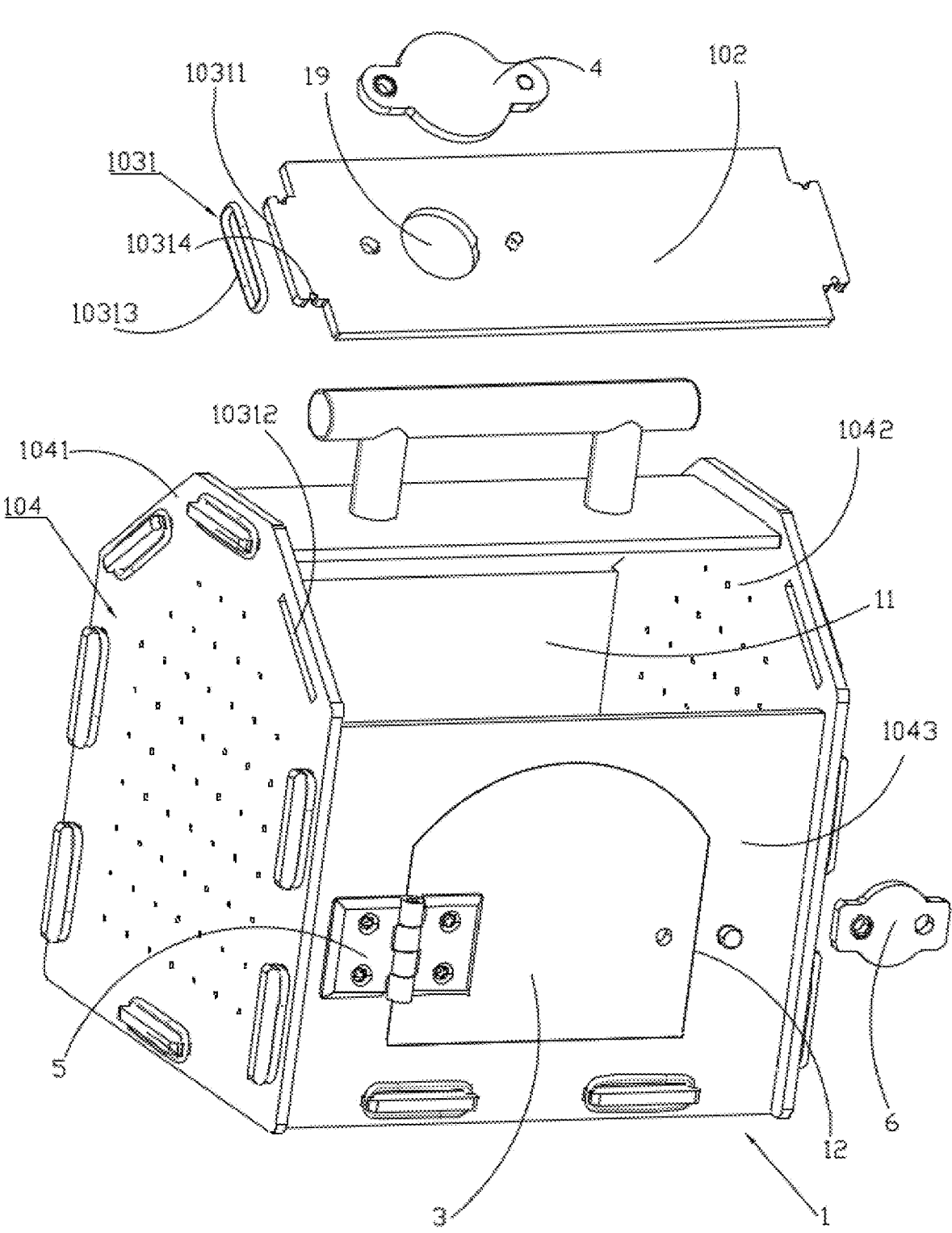
FIG. 19 is another exploded view according to the present invention.

Referring to FIGS. 18 to 19, in this embodiment, the main crate body 1 further includes a first feeding window 19 and a cover 4, the first feeding window 19 is in communication with the containment space 11, and the cover 4 is connected to the main crate body 1. The cover 4 is movable between an open position and a closed position. When the cover 4 is in the closed position, the cover 4 covers the first feeding window 19. When the cover 4 is in the open position, the cover 4 exposes the first feeding window 19. The cover 4 is rotatably connected to the main crate body 1 and rotates between the open and closed positions. Specifically, the width of the first feeding window 19 is smaller than that of the first pet access opening 12. Through the above structure, a user may pivot the cover 4 to open the first feeding window 19 and deliver food through the first feeding window 19 into the containment space 11 for pet feeding. Further, since the width of the first feeding window 19 is smaller than that of the first pet access opening 12, the pet can pass through the larger first pet access opening 12 but cannot pass through the smaller first feeding window 19, thereby preventing the pet from escaping through the first feeding window 19 during feeding operations.

In this embodiment, the main crate body 1 is a transparent one, and the main crate body 1 has a plurality of second ventilation holes 101. Through the above structure, the ventilation performance of the containment space 11 is significantly improved compared with an ordinary airtight main crate body 1. This improvement in air permeability ensures a more comfortable habitat for pets within the containment space 11.

In this embodiment, the main crate body 1 includes an upper sidewall 102, a lower sidewall 103 and a connecting sidewall 104; the upper sidewall 102 is connected to the lower sidewall 103 via the connecting sidewall 104, and the upper sidewall 102, the lower sidewall 103 and the connecting sidewall 104 enclose to form the containment space 11. The main crate body 1 further includes a second pet access opening 16 and a second door 3, and the second pet access opening 16 is in communication with the containment space 11. The second door 3 is connected to the main crate body 1 and is movable between an open position and a closed position. When the second door 3 is in the closed position, the second door 3 covers the second pet access opening 16. When the second door 3 is in the open position, the second door 3 exposes the second pet access opening 16. The first pet access opening 12 is disposed on the upper sidewall 102; and the second pet access opening 16 is disposed on the connecting sidewall 104. Specifically, the upper sidewall 102, the lower sidewall 103 and the connecting sidewall 104 are integrally formed and connected or are detachably connected to each other; or the sidewalls of the main crate body 1 are thermally bent to form the upper sidewall 102, the lower sidewall 103 and the connecting sidewall 104. Further, the upper sidewall 102, the lower sidewall 103 and the connecting sidewall 104 are connected by adhesive bonding, thermal fusion bonding, or via a snap-fit 1031. Furthermore, the main crate body 1 further has a plurality of second ventilation holes 101 and a plurality of third ventilation holes 105, the plurality of second ventilation holes 101 are disposed on one side of the connecting sidewall 104, and the plurality of third ventilation holes 105 are disposed on the other side of the connecting sidewall 104. The plurality of second ventilation holes 101 are arranged in sequence along longitudinal and transverse directions of a left sidewall 1041 of the connecting sidewall 104; the plurality of third ventilation holes 105 are arranged in sequence along longitudinal and transverse directions of a right sidewall 1042 of the connecting sidewall 104. Through the above structure, the connection among the upper sidewall 102, the lower sidewall 103 and the connecting sidewall 104 is effectively achieved. Moreover, ventilation holes are provided on both the left and right sides of the connecting sidewall 104 and on the door of the upper sidewall 102, enhancing the air circulation within the containment space 11. This ensures the containment space 11 is odor-free and prevents bacteria from growing therein. Further, since the first pet access opening 12 is disposed on the upper sidewall 102 and the second pet access opening 16 is disposed on the connecting sidewall 104, it facilitates the pet to enter the containment space 11 from different directions. Meanwhile, it also facilitates pet owners to place and retrieve the pet from different directions.

Specifically, the upper sidewall 102, the lower sidewall 103 and the connecting sidewall 104 are connected via the snap-fit 1031. The snap-fit 1031 includes a first insertion protrusion 10311 provided on the upper sidewall and the lower sidewall, a first insertion opening 10312 provided on the connecting sidewall, and a retaining ring 10313. The first insertion protrusion is connected to the first insertion opening, and the retaining ring is detachably sleeved over the first insertion protrusion. The retaining ring is used to stop the first insertion protrusion within the first insertion opening. The first insertion protrusion has a mounting groove 10314, and the retaining ring is sleeved in the mounting groove.

In this embodiment, a width of the first pet access opening 12 ranges from 1 mm to 1 m; a width of the first door 2 ranges from 1 mm to 1 m; a length of the main crate body 1 ranges from 1 mm to 1 m, a width of the main crate body 1 ranges from 1 mm to 1 m, and a height of the main crate body 1 ranges from 1 mm to 1 m; the first door 2 covers 1% to 100% of the first pet access opening 12; a width of the first magnet 24 ranges from 0.1 mm to 1 m; a weight of the first magnet 24 ranges from 0.01 g to 100 g, and a weight of the main crate body 1 ranges from 10 g to 100 kg. Through the above structure, the dimensions are rationally configured to accommodate the usage requirements of most pets. A pet crate with a smaller size and the first pet access opening 12 may be used to house small-sized pets, such as insects. A pet crate with a larger size and the first pet access opening 12 may be used to house large-sized pets, such as cats, dogs, or other large pets. Specifically, the width of the first handle 22 ranges from 0.1 mm to 1 m; the width of the first ventilation hole 23 ranges from 0.1 mm to 10 cm; the width of the second ventilation hole 101 ranges from 0.1 mm to 10 cm; the width of the third ventilation hole 105 ranges from 0.1 mm to 10 cm; the length of the first slide rail 26 ranges from 1 mm to 1 m.

In this embodiment, the first slide rail 26 extends from the front side of the left sidewall 1041 to the rear side of the connecting sidewall 104. The rear sidewall 1044 covers one end of the first slide rail 26. The front sidewall 1043 has a first avoidance groove 15, and the other end of the first slide rail 26 is exposed through the first avoidance groove 15. The first door 2 is inserted into the first slide rail 26 through the first avoidance groove 15. The second slide rail 35 extends from the left side of the front sidewall 1043 to the right side of the front sidewall 1043. The left sidewall 1041 covers one end of the second slide rail 35. The right sidewall 1042 has a second avoidance groove 10421, and the other end of the second slide rail 35 is exposed through the second avoidance groove 10421. The second door 3 is inserted into the second slide rail 35 through the second avoidance groove 10421.

In this embodiment, the connecting sidewall 104 includes a left sidewall 1041, a right sidewall 1042, a front sidewall 1043, and a rear sidewall 1044. The left side of the upper sidewall 102 is connected to the left side of the lower sidewall 103 via the left sidewall 1041. The right side of the upper sidewall 102 is connected to the right side of the lower sidewall 103 via the right sidewall 1042. The front side of the upper sidewall 102 is connected to the front side of the lower sidewall 103 via the front sidewall 1043. The rear side of the upper sidewall 102 is connected to the rear side of the lower sidewall 103 via the rear sidewall 1044. The first pet access opening 12 is disposed on the upper sidewall 102, the second pet access opening 16 is disposed on the front sidewall 1043, the second ventilation holes 101 are disposed on the left sidewall 1041, and the third ventilation holes 105 are disposed on the right sidewall 1042. The number of the first mounting holes 25 is at least 2, and the number of the first magnets 24 is at least 2. The number of the second mounting holes 14 is at least 2, and the number of the second magnets 13 is at least 2. The number of the third mounting holes 34 is at least 2, and the number of the third magnets 33 is at least 2. The number of the fourth mounting holes 18 is at least 2, and the number of the fourth magnets 17 is at least 2. Specifically, the second pet access opening 16 is disposed in the center of the connecting sidewall 104. Further, the widths of the first ventilation holes 23, the second ventilation holes 101, and the third ventilation holes 105 are all the same. Furthermore, the length of the connecting sidewall 104 is greater than its width. Furthermore, the thickness of the main crate body 1 ranges from 0.1 mm to 10 cm. Furthermore, the second ventilation holes 101 are disposed on the upper side of the connecting sidewall 104. Furthermore, the first ventilation holes 23 are disposed in the center of the first door 2. Furthermore, the first handle 22 is disposed at the edge of the first door 2, and the first handle 22 is disposed in the middle of the edge of the first door 2. Furthermore, the first magnet 24 is disposed on the front side of the first door 2, and the first handle 22 is disposed on the rear side of the first door 2. Through the above structure, the arrangement of the first magnet 24, the second magnet 13, the third magnet 33 and the fourth magnet 17 is effectively achieved. Moreover, since the first magnet 24 is disposed on the front side of the first door 2 and the first handle 22 is disposed on the rear side of the first door 2, it is convenient for users to push the first door 2 to the closed position through the first handle 22 on the rear side of the first door 2. And the first magnet 24 on the front side of the first door 2 attracts the second magnet 13 to lock the first door 2 in the closed position.

In some other embodiments, the first slide rail 26 is connected to the main crate body 1 by adhesive bonding or thermal fusion bonding.

In this embodiment, the first handle 22 is a protruding one. The first handle 22 has a shape selected from a square shape, a circular shape, or an oval shape. Through the above structure, the design is reasonable and the structure is simple. The arrangement of the first handle 22 is effectively achieved, which facilitates the user to slide the first door 2 along the first slide rail 26 through the first handle 22. Specifically, one side edge of the first handle 22 is aligned with one side edge of the first door 2.

In this embodiment, the main crate body 1 is an acrylic main crate body 1, a glass main crate body 1, a metal main crate body 1, a plastic main crate body 1, a bamboo main crate body 1, or a wooden main crate body 1. Through the above structure, the arrangement of the main crate body 1 is effectively achieved, facilitating the production and installation of the main crate body 1.

Referring to FIGS. 18 to 19, in some other embodiments, the first door 2 is rotatably connected to the main crate body 1 to rotate between an open position and a closed position; a hinge 5 and a door stop 6 are further provided, one end of the first door 2 is rotatably connected to the main crate body 1 via the hinge 5; the door stop 6 is rotatably connected to the main crate body 1 and is rotatable between a blocking position and a releasing position. When the door stop 6 rotates to the blocking position, the door stop 6 blocks the other end of the first door 2 within the first pet access opening 12. When the door stop 6 rotates to the releasing position, the door stop 6 disengages the other end of the first door 2 from the first pet access opening 12.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

What is claimed is:

1. A pet housing crate, comprising:
a main crate body, wherein sidewalls of the main crate body enclose to form a containment space for accommodating a pet, and the main crate body has a first pet access opening in communication with the containment space;
a first door connected to the main crate body and movable between:
a closed position covering the first pet access opening, and
an open position exposing the first pet access opening;
wherein the first door is transparent;
wherein the pet housing crate further comprises a first magnet mounted on the first door and a second magnet mounted on the main crate body; wherein the main crate body comprises an upper sidewall, a lower sidewall and a connecting sidewall; the upper sidewall is connected to the lower sidewall via the connecting sidewall, and the upper sidewall, the lower sidewall and the connecting sidewall enclose to form the containment space; the connecting sidewall comprises a front sidewall and a rear sidewall that are opposite to each other, the upper sidewall extends from the rear sidewall towards the front sidewall, and a width of the upper sidewall is smaller than a width of the lower sidewall, so that the first pet access is formed between an edge of the upper sidewall and an inner surface of the front sidewall; the second magnet is mounted at one side of the upper sidewall, and the first magnet is only mounted at one side of the first door such that only the one side of the first door is configured to connect with the upper side wall by magnetic attraction; when the first door is moved to the closed position, the first door overlaps with the upper sidewall, the first magnet coincides with the second magnet completely in a manner that a peripheral edge of the first magnet is aligned with a peripheral edge of the second magnet, so that the first magnet and the second magnet attract each other to lock the first door in the closed position.

2. The pet housing crate according to claim 1, wherein the first door comprises a first door body and a first handle connected to the first door body.

3. The pet housing crate according to claim 1, wherein the first door has a plurality of first ventilation holes arranged in sequence along longitudinal and transverse directions thereof.

4. The pet housing crate according to claim 1, wherein the first door has a first mounting hole, and the first magnet is embedded in the first mounting hole; the main crate body has a second mounting hole, and the second magnet is embedded in the second mounting hole.

5. The pet housing crate according to claim 4, wherein a width of the first pet access opening ranges from 1 mm to 1 m; a width of the first door ranges from 1 mm to 1 m; a length of the main crate body ranges from 1 mm to 1 m, a width of the main crate body ranges from 1 mm to 1 m, and a height of the main crate body ranges from 1 mm to 1 m; the first door covers 1% to 100% of the first pet access opening; a width of the first magnet ranges from 0.1 mm to 1 m; a weight of the first magnet ranges from 0.01 g to 100 g, and a weight of the main crate body ranges from 10 g to 100 kg.

6. The pet housing crate according to claim 1, wherein the first door is slidably connected to the main crate body to slide between an open position and a closed position; further comprising a first slide rail connected to the main crate body, the first door is configured to slide along the first slide rail.

7. The pet housing crate according to claim 6, wherein the first slide rail is connected to an inner surface of the main crate body; the first slide rail extends from one side of the main crate body to the other side thereof, the sidewall of the main crate body is configured to cover one end of the first slide rail; the main crate body further has a first avoidance groove, the other end of the first slide rail is exposed through the first avoidance groove, and the first door is inserted into the first slide rail through the first avoidance groove.

8. The pet housing crate according to claim 6, wherein the first slide rail is either integrally formed with or detachably connected to the main crate body.

9. The pet housing crate according to claim 1, wherein the main crate body further comprises a first feeding window and a cover; the first feeding window is in communication with the containment space, the cover is connected to the main crate body and is movable between:

a closed position where the first feeding window is covered by the cover, and an open position where the first feeding window is exposed by the cover.

10. The pet housing crate according to claim 9, wherein the cover is rotatably connected to the main crate body and is rotatable between the open position and the closed position.

11. The pet housing crate according to claim 9, wherein the first feeding window has a width smaller than that of the first pet access opening.

12. The pet housing crate according to claim 1, wherein the main crate body is transparent; the main crate body has second ventilation holes.

13. The pet housing crate according to claim 1, wherein the main crate body further comprises a second pet access opening and a second door, and the second pet access opening is in communication with the containment space; the second door is connected to the main crate body and is movable between:

a closed position where the second pet access opening is covered by the second door, and an open position where the second pet access opening is exposed by the second door;

wherein the first pet access opening is disposed on the upper sidewall; and the second pet access opening is disposed on the connecting sidewall.

14. The pet housing crate according to claim 1, wherein the upper sidewall, the lower sidewall and the connecting sidewall are integrally formed and connected or are detachably connected to each other; or the sidewalls of the main crate body are thermally bent to form the upper sidewall, the lower sidewall and the connecting sidewall.

15. The pet housing crate according to claim 1, wherein the upper sidewall, the lower sidewall and the connecting sidewall are joined by a technique selected from: adhesive bonding, thermal fusion bonding, or snap-fit connection.

16. The pet housing crate according to claim 1, wherein the main crate body further has a plurality of second ventilation holes and a plurality of third ventilation holes, the plurality of second ventilation holes are disposed on one side of the connecting sidewall, and the plurality of third ventilation holes are disposed on the other side of the connecting sidewall; the plurality of second ventilation holes are arranged in sequence along longitudinal and transverse directions of a left sidewall of the connecting sidewall; the plurality of third ventilation holes are arranged in sequence along longitudinal and transverse directions of a right sidewall of the connecting sidewall.

17. The pet housing crate according to claim 1, wherein the first door is rotatably connected to the main crate body to rotate between an open position and a closed position; further comprising a hinge and a door stop, one end of the first door is rotatably connected to the main crate body by the hinge; the door stop is rotatably connected to the main crate body and is rotatable between:

a blocking position where the other end of the first door is blocked within the first pet access opening by the door stop; and a releasing position where the other end of the first door is disengaged from the first pet access opening by the door stop.

18. A pet housing crate, comprising:

a main crate body, wherein sidewalls of the main crate body enclose to form a containment space for accommodating a pet, and the main crate body has a first pet access opening in communication with the containment space;

a first door connected to the main crate body and movable between:

a first closed position covering the first pet access opening, and a first open position exposing the first pet access opening;

wherein the first door is transparent;

wherein the main crate body further comprises a second pet access opening and a second door, and the second pet access opening is in communication with the containment space; the second door is connected to the main crate body and is movable between:

a second closed position where the second pet access opening is covered by the second door, and a second open position where the second pet access opening is exposed by the second door;

wherein the second door is transparent;

wherein a moveable direction of the first door intersects with a moveable direction of the second door.

19. The pet housing crate according to claim 18, wherein the second door comprises a second door body and a second handle, and the second handle is connected to the second door body; the second door is magnetically connected to the main crate body; further comprising a third magnet, the second door has a third mounting hole, and the third magnet is embedded in the third mounting hole; further comprising a fourth magnet, the main crate body has a fourth mounting hole, and the fourth magnet is embedded in the fourth mounting hole; the third magnet and the fourth magnet are attracted to connect the second door to the main crate body and lock the second door in the closed position; further comprising a second slide rail connected to the main crate body, the second door is configured to slide along the second slide rail.

20. A pet housing crate, comprising:

a main crate body, wherein sidewalls of the main crate body enclose to form a containment space for accommodating a pet, and the main crate body has a first pet access opening in communication with the containment space;

a first door connected to the main crate body and movable
  between:
a first closed position covering the first pet access open-
  ing, and
a first open position exposing the first pet access opening;  5
wherein the first door is transparent;
wherein the main crate body further comprises a second
  pet access opening and a second door, and the second
  pet access opening is in communication with the con-
  tainment space; the second door is connected to the  10
  main crate body and is movable between:
a second closed position where the second pet access
  opening is covered by the second door, and
a second open position where the second pet access
  opening is exposed by the second door;  15
wherein the second door is transparent;
wherein the first pet access is oriented upwards and the
  second pet access is oriented laterally.

\* \* \* \* \*